United States Patent [19]

Damon

[11] 4,049,907
[45] Sept. 20, 1977

[54] COMBINATION PHOTOGRAPHING AND PROMPTING SYSTEMS

[76] Inventor: James William Damon, P.O. Box 282, Bonner Springs, Kans. 66012

[21] Appl. No.: 318,597

[22] Filed: Dec. 26, 1972

[51] Int. Cl.² ............................................. H04N 5/645
[52] U.S. Cl. .......................................... 358/185; 352/4
[58] Field of Search ....... 178/DIG. 30, 7.88, DIG. 1, 178/6, 7.91; 352/4

[56] References Cited

U.S. PATENT DOCUMENTS

| 2,883,902 | 4/1959 | Oppenheimer | 88/16 |
| 2,934,601 | 4/1960 | Oppenheimer | 178/6.8 |
| 3,461,228 | 8/1969 | Bookman | 178/DIG. 1 |

Primary Examiner—Robert L. Griffin
Assistant Examiner—Edward L. Coles
Attorney, Agent, or Firm—William J. Ruano

[57] ABSTRACT

A combination prompting device (such as a known roll type or a video monitor used as a prompter) and a television camera, together with a reflecting system, including two transparent or pellicle mirrors (or clear glass or plastic sheets), in periscope embodiments, angularly mounted on said camera, one being disposed in front of the lens, substantially angled, such as at about 45° to the longitudinal axis thereof, whereby an actor in front of the camera looking in the direction of the camera lens can see a reflected script or picture of himself and/or other scenes related to the program exhibited on the screen of the prompting device.

4 Claims, 2 Drawing Figures

COMBINATION PHOTOGRAPHING AND PROMPTING SYSTEMS

FIELD OF THE INVENTION

This invention relates to method and means for producing television and/or motion pictures and, more particularly, to visual prompting and reflecting systems for actors, in combination with television cameras.

A principal object of the invention is to provide a combination photographing and prompting system, including a prompting device, such as a scroll type or video monitor used instead thereof, mounted on a movable camera, and a reflecting system therefor whereby an actor in front of the camera looking in the direction of the lens thereof can see related information exhibited on said prompting device.

A further object of some embodiments is to use a video monitor as a prompting device mounted on a camera to show scripts, directions and/or related scenes thereon, such as those the actor may be commenting upon and in some cases to show pictures of himself, preferably reversed from right to left as persons are accustomed to seeing themselves.

A further object of some embodiments of the invention is to enable the actor to see reflected prompting information when he looks directly toward the lens, also to see substantially the same information when he looks directly toward the prompting device.

A still further object of some embodiments of the invention is to provide a combination television or motion picture camera, a visual prompting means mounted on said camera and a periscope reflecting system mounted on said camera for viewing the screen of said prompting device while apparently looking toward the lens of said camera.

With the foregoing and other objects in view, it is apparent that changes in the precise embodiments of the invention therein disclosed, may be made within the scope of what is claimed without departing from the spirit of the invention. Other objects and advantages, of the present invention, will, of course, become apparent and immediately suggested themselves to those skilled in the art to which the invention is directed from a reading of the following specification in connection with the accompanying drawing in which:

FIG. 1 is a semi-diagrammatic cut-away view of a combination television camera, video monitor prompter and periscope mirror viewing system therefor embodying my invention.

DETAILED DESCRIPTION OF THE DRAWINGS

Figure 1:
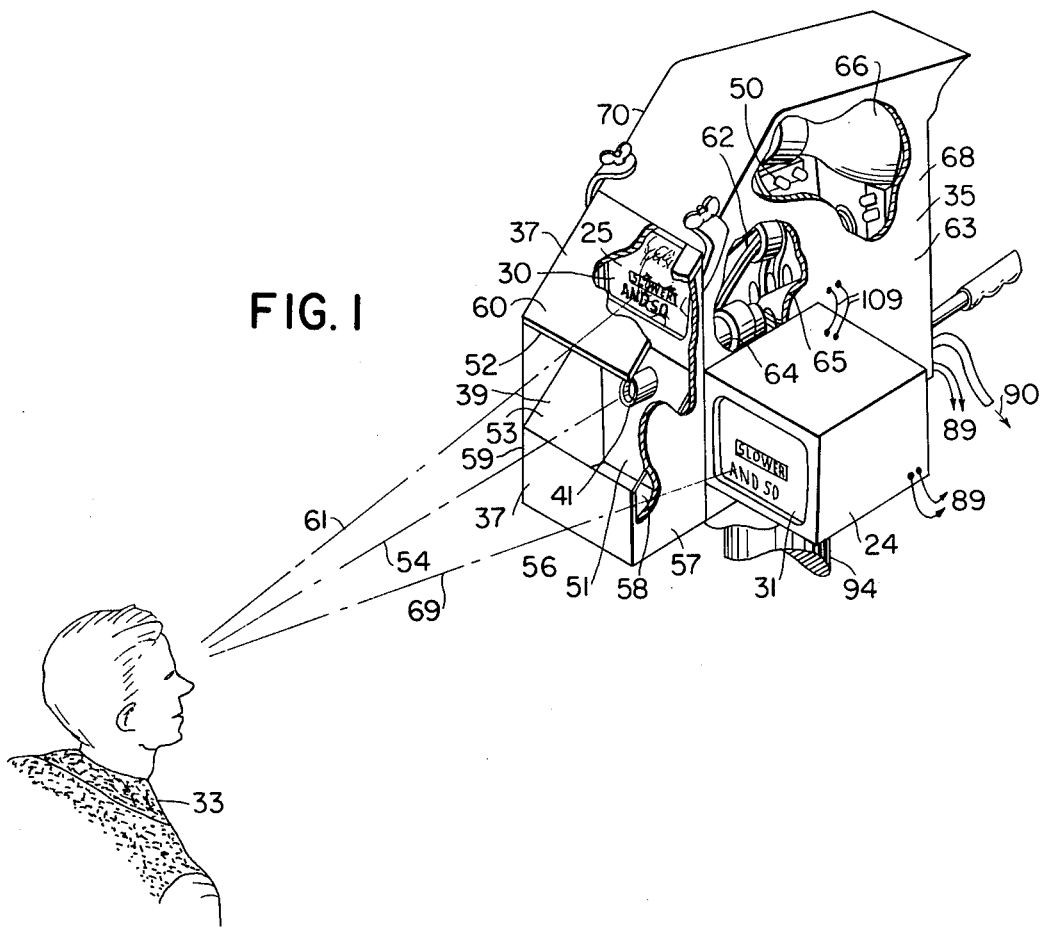

Referring more particularly to FIG. 1 of the drawing, when the open front, open back mirror-holding frame 37 is secured to the front 51 of the combination camera and monitor 35, screen 25 is reflected from a 45° angled preferably transparent mirror 52 down to and forward from 45° angled transparent mirror 53 disposed in front of camera lens 41 so that the actor looking along line 54 apparently sees the images appearing on said screen 25 where said lens 41 really is.

When said mirror-holding frame 37 is removed or when said mirror 52 is transparent, said screen 25 may be seen by said actor by looking directly at said screen along line 61 which will still give the impression that he is looking in the direction of the camera and viewing audience, especially if he looks at the lower part of said screen which is nearest to said lens 41 as the script moves upwardly thereon. The cathode ray tube of the video monitor may be secured to the front or front top of a camera body but in the embodiment shown in FIG. 1 it is secured within the top front of the camera body 63 above the photo-electric camera tube 64 as is seen through cut-away area 65 and below the rear-facing view finder cathode ray tube 66 seen through cut-away area 67. The screen 25 of the video monitor 62 faces forwardly disposed in a window in the front of the camera body or in a window of a separate video monitor secured to said camera above the lens thereof.

In possible embodiments, more than one video monitor prompters may be secured to at least one of said cameras so that the actor may look in several directions and still see the prompting images, said monitor 24 being secured to the left side 68 of said camera 35 (that is, on the right as viewed in FIG. 1) so that said actor 33 looking along a line 69 sees said screen 31 and appears to be looking at the viewing audience when said camera is close to him. It is apparent that another video monitor could be secured to the right side 70 of said camera 35 (that is, to the left as viewed in FIG. 1) just as monitor 21 is secured to the left side 68 of the camera 35.

In some embodiments, a moving script previously videotaped may be exhibited on the video monitors in the present invention instead of the simultaneous photographing thereof.

In some embodiments, scenes of the related subjects being commented on or reacted to by said actor may be shown on the video monitors in the present invention while he is being photographed through a transparent mirror in the present invention.

In some embodiments, said video monitor prompters are connected to at least one of the video outputs 90 of said television camera 35. In this way an actor facing one camera can see the image of himself or another actor not shown, being photographed by one of said cameras, to whom he is supposed to be talking or listening.

In some embodiments wherein it is desirable to show images of an actor on the video monitor attached to the camera taking his picture, the output of the video amplifier therein which also supplies the image to the view finder cathode ray tube can be fed into the input of the video monitor prompter attached to said camera. This enables the actor being photographed by said camera to correct and adjust his own actions, expressions and positions.

In some embodiments, the actor's images may be reversed from right to left, either electronically or by suitable mirrors as persons are accustomed to seeing themselves. The scripts are so displayed that they are not reversed from right to left as viewed by the actor, although they may be reversed or inverted on the monitor with a single mirror so that the mirror corrects them.

In some embodiments the program as transmitted or edited may be shown on all of said video minotors attached to said cameras, thereby enabling said actor to tell which camera is photographing him at a given time.

Said actor-photographing cameras are secured to the pan-tilt heads on preferably movable camera support parts of which 94 are shown. So the video minotors and reflecting systems therefor being secured to said cameras can be used by the actor as the camera pans, tilts and follows him around, which is not possible with prompters and mirror systems separately mounted.

Since certain changes may be made in the above invention and different embodiments of the invention could be made without departing from the scope thereof, it is intended that all matter contained in the above description or shown in the accompanying drawing shall be interpreted as illustrative and not in a limiting sense. It is also to be understood that the following claims are intended to cover all of the generic and specific features of the invention herein described, and all statements of the scope of the invention which, as a matter of language might be said to fall therebetween.

Having now described and illustrated several forms of my invention, I wish it to be understood that my invention is not to limited to the specific form or arrangements of parts herein described and shown, or specifically covered by my claims.

Having thus fully described my invention, what I claim as new and desire to secure by Letters Patent is:

1. A combination photographing and prompting system for a performer including:
   a pan-tilt head thereon,
   a motion picture or television camera mounted on said pan-tilt head,
   a prompter visual-information — displaying device unit mounted on said camera pan-tilt head combination, the screen of said prompter facing forwardly and disposed above the camera's lens,
   an image-reflecting periscope-like, two mirror system secured to said camera pan-tilt head combination, a transparent mirror or reflective transparent sheet of said system being disposed in front of said camera's lens at a substantial angle relative to the longitudinal axis thereof, the reflective surface used of said mirror facing away from said lens, a second mirror or the like of said system secured to said camera pan-tilt head combination and disposed in front of the screen of said prompter at a substantial angle relative thereto, substantially parallel to the first mirror in substantial spaced relationship thereto, the reflective surface used of said second mirror facing and prompter screen and the first said mirror reflecting information exhibited thereon onto the said first transparent mirror which relfects said information in a direction about parallel to the longitudinal axis of said lens toward a performer's position in front of said camera, whereby said performer may see said information while appearing to be looking toward the direction of the camera lens and hence toward the viewing audience, said camera photographing said performer through said first transparent mirror, a mounting means secured to said mirrors and holding said mirrors disposed in spaced relationship to each other.

2. A combination photographing and prompting system for a performer including:
   a camera support,
   a pan-tilt head thereon,
   a television camera mounted on said pan-tilt head, a
   video monitor prompter visual information-displaying unit mounted on said camera,
   the screen of said monitor disposed above said camera's lens and facing forwardly,
   an image-reflecting periscope-like, two mirror system secured to said camera pan-tilt head combination,
   a transparent mirror of said system being disposed in front of said lens at a substantial angle relative to the longitudinal axis thereof,
   a second transparent or opaque mirror or clear reflective sheet of said periscope system secured to said camera pan-tilt head combination and disposed in front of the screen of said prompter at a substantial angle relative thereto, substantially parallel to the first mirror in substantial spaced relationship thereto,
   the reflective surface used of said second mirror facing said prompter screen and the first said transparent mirror reflecting information exhibited thereon onto the first transparent mirror which reflects said information in a direction about parallel to the longitudinal axis of said lens toward a performer's position in front of said camera, whereby said performer may see said information while appearing to be looking toward the direction of the camera lens and hence toward the viewing audience, the exhibiting on said video monitor of one or more of the following items of information relative to the role played by said performer; images taken by said camera reversed from right to left of said performer while being photographed through said transparent mirror by said lens of said television camera, scripts relative to the role of said actor photographed simultaneously by another television camera,
   video images of the scenes being commented upon by said performer,
   video taped images of scripts relative to the role of said performer photographed prior to his performance, the screen of said video monitor being disposed near to the upper part of said camera's lens.

3. A combination photography and prompting system for an actor including; a camera support, a pan-tilt head thereon, a television camera mounted on said pan-tilt head, a video monitor prompter, visual information displaying unit mounted on said camera, the screen of said monitor disposed above said camera's lens and facing forwardly toward said actor's position, the lower part of said monitor's screen being disposed near to the upper part of said camera's lens, thereby exhibiting on said monitor of one or more of the following items relative to the role played by said actor, images taken by said camera reversed from right to left of said actor while being photographed by said television camera, scripts relative to the role of said actor, video images relative to the role of said actor.

4. A combination photographing and prompting system for a performer including:
   a camera support,
   a pan-tilt head thereon,
   a motion picture or television camera mounted on said pan-tilt head,
   a prompter visual-information-displaying device unit mounted on said camera pan-tilt head combination, the screen of said prompter facing forwardly,
   an image-reflecting periscope-like, two mirror system secured to said camera pan-tilt head combination, a transparent mirror or reflective transparent sheet of said system being disposed in front of said camera's lens at a substantial angle relative to the longitudinal axis thereof, the reflective surface used of said mirror facing away from said lens, a second mirror or the like of said system secured to said camera pan-tilt head combination and disposed in front of the screen of said prompter at a substantial angle relative thereto, substantially parallel to the first mirror in substantial spaced relationship thereto, the reflective surface used of said second mirror facing said prompter screen and the first said mirror reflecting information exhibited thereon onto the said first transparent mirror which reflects said information in a direction about parallel to the longitudinal axis of said lens toward a performer's position in front of said camera, whereby said performer may see said information while appearing to be looking toward the direction of the camera lens and hence toward the viewing audience, said camera photographing said performer through said first transparent mirror, and a mounting means secured to said mirrors and holding said mirrors disposed in spaced relationship to each other.

* * * * *